United States Patent
Lin

(10) Patent No.: US 8,131,949 B2
(45) Date of Patent: Mar. 6, 2012

(54) MEMORY ACCESS CONTROL DEVICE EQUIPPED WITH MEMORY ACCESS REQUEST GENERATING MODULES/ARBITRATOR AND CONTROL METHOD THEREOF

(75) Inventor: Liang-Ta Lin, Miaoli County (TW)

(73) Assignee: ILI Technology Corp., Jhubei, Hsinchu County (TW)

( * ) Notice: Subject to any disclaimer, the term of this patent is extended or adjusted under 35 U.S.C. 154(b) by 539 days.

(21) Appl. No.: 12/428,486

(22) Filed: Apr. 23, 2009

(65) Prior Publication Data

US 2010/0049936 A1    Feb. 25, 2010

(30) Foreign Application Priority Data

Aug. 21, 2008    (TW) .............................. 97131894 A

(51) Int. Cl.
*G06F 13/18* (2006.01)

(52) U.S. Cl. ........................ 711/151; 711/158; 711/169

(58) Field of Classification Search .................. 711/151, 711/147, 158, 154, 169, 167
See application file for complete search history.

(56) References Cited

U.S. PATENT DOCUMENTS

| 8,065,457 B2 * | 11/2011 | Tischler | 710/240 |
| 2010/0049936 A1 * | 2/2010 | Lin | 711/169 |

* cited by examiner

*Primary Examiner* — Andrew Q Tran
(74) *Attorney, Agent, or Firm* — Winston Hsu; Scott Margo

(57) ABSTRACT

A memory access control apparatus includes a plurality of memory access request generating modules and an arbitrator. When one of the memory access request generating modules receives a second memory access event while a memory device is performing a first memory access operation according to a first memory access request in response to a first memory access event, the memory access request generating module outputs a second memory access request corresponding to the second memory access event to the memory device after a delay time. The arbitrator is implemented for arbitrating memory access requests respectively outputted from the memory accessing request generating modules.

9 Claims, 6 Drawing Sheets

MEMORY ACCESS CONTROL DEVICE EQUIPPED WITH MEMORY ACCESS REQUEST GENERATING MODULES/ARBITRATOR AND CONTROL METHOD THEREOF

BACKGROUND OF THE INVENTION

1. Field of the Invention

The present invention relates to a memory access control device and a control method thereof, and more particularly, to a memory access arbitrating device capable of selectively generating a second writing request after a delay time for ensuring the correctness of the memory access requests of a single-port memory when a first writing request and a first reading request are overlapped, and a controlling method thereof.

2. Description of the Prior Art

Recent technological progress and the requirements for modern computing system have resulted in higher requirements for speeds of data reading, transmission, storing and displaying, and accuracy of the aforementioned operations, wherein a critical point of the performance of a computing system is the memory access operations corresponding to the computing system.

It is therefore an important issue to ensure access efficiency of memory devices, to optimize the performance of the whole system accordingly. However, the progress of technology and the requirements for a variety of functions have led to computing systems of ever increasing complexity. A memory access request control device must arrange the order of incoming access commands appropriately, especially when the memory access control device receives different types of memory access requests (e.g. a memory reading request and memory writing request) at the same time, for avoiding the memory access requests being omitted/reduplicated erroneously and for ensuring the stability and correctness of the single port memory.

A conventional memory access control device includes a memory read request generating module, a memory write request generating module, a pulse width control module corresponding to the memory read request generating module, a pulse width control module corresponding to the memory write request generating module, and an arbitrator. The memory read request generating module and the memory write request generating module of the conventional memory access control device are implemented for generating read requests and write requests, respectively, according to the received memory access events when a computing system outputs a memory read command/memory write command (a read/write event) to a single-port memory. That is, the computing system has to control the access operations to the single-port memory by generating a memory access command (access event) Event_WR/Event_RD via controlling the conventional memory access control device to output a memory read grant signal/memory write grant signal (Grant_RD/Grant_WR).

When the computing system outputs the memory write command/event Event_WR to the single-port memory, the write request generating module simultaneously generates a corresponding memory write request Req_WR to the arbitrator according to the memory write event Event_WR; when the computing system generates a memory read command/event Event_RD to the single-port memory, the read request generating module generates a memory read request Req_RD to the arbitrator that corresponds to the memory read event Event_RD. The arbitrator then arbitrates a priority between the memory read/write commands for generating the corresponding memory access grant signals according to the received memory read request/memory write request Req_RD/Req_WR. For example, the arbitrator generates the memory read grant signal/memory write grant signal Grant_RD/Grant_WR to the single-port memory, thereby allowing the computing system to execute the memory read operations/memory write operations according to the memory read grant signal/the memory write grant signal Grant_RD/Grant_WR.

That is, the required time for the single-port memory to execute a memory read operation and the required time to execute a memory write operation are respectively restricted by the pulse width control module corresponding to the memory read operation and the pulse width control module corresponding to the memory write operation, wherein the amount of time taken for the memory read operation and the memory write operation are determined by the specification with which the single-port memory complies.

Please refer to FIG. 1. FIG. 1 is a diagram illustrating signals of a conventional memory access control device. Please note that each of the memory access events (Event_RD/Event_WR) is synchronized with the corresponding memory access request (Req_RD/Req_WR).

That is, a corresponding write request is generated simultaneously when a write event occurs. FIG. 1 illustrates an example of a collision between a memory read event and a memory write event. In this example, the arbitrator sets a memory read grant signal Grant_RD as logic "1" when a memory read request Req_RD is logic "1" since, at this time, there is no collision between memory access operations of the single-port memory. In other words, the single-port memory performs the corresponding memory read operation while the memory read grant signal Grant_RD is logic '1'.

However, when the memory write request Req_WR is converted from logic "0' to logic "1" the arbitrator sets the corresponding memory write grant signal Grant_WR from logic "0" to logic "1" for permitting the single-port memory to execute the memory write operation only after the memory read grant signal Grant_RD is converted from logic "1" to logic "0" (i.e., the memory read operation corresponding to the memory read grant signal is finished) due to a single-port memory being restricted to executing one access operation at a time.

This restriction leads to a following memory write request Req_WR not being permitted to be set as logic "1" before the pulse width control unit corresponding to the memory write control module finishes a memory write grant process corresponding to a former memory write operation. The following memory write request Req_WR is allowed only after the memory write grant signal Grant_WR is converted from logic "1' to logic "0".

An allowed write period (P_WR) between two write grant signals therefore cannot be smaller than a summation value of a time magnitude (T_RD) of one read grant signal and a time magnitude (T_WR) of one write grant signal Grant_WR. The aforementioned restriction is expressed by the equation:

$$P\_WR \geq T\_WR + T\_RD.$$

The performance of memory write operations is excessively affected by the memory write period P_WR. There is therefore a demand to design a system and a control method thereof for reducing the time magnitude of the memory write period P_WR, to promote the performance of the memory write operations.

SUMMARY OF THE INVENTION

It is therefore one of the objectives of the present invention to provide a memory access control device and control method thereof that outputs a memory write request corresponding to a memory write event only after confirming a memory write grant signal has been reset to a predetermined logic level (e.g., logic "0") by referring to the state of the memory write grant signal when the disclosed memory access control device receives a memory write event, thereby reducing the required time corresponding to the memory write operation of a single-port memory and further promoting the access performances of the single-port memory.

In accordance with an embodiment of the present invention, a memory access control device is provided. The memory access control device includes a first memory access request generating module, a second memory access request generating module, and an arbitrator. The first memory access request generating module is implemented for outputting a second memory access request corresponding to a second memory access event to a memory device after a delay time for executing a second memory access operation, wherein the first memory access request module receives the second memory access event while the memory device is performing a first memory access operation according to a first memory access request corresponding to a first memory access event. The second memory access request generating module is implemented for outputting a third memory access request according to a third memory access event to the memory device for performing a third memory access operation, wherein the first memory access operation and the second memory access operation belong to one memory access operation between a memory writing operation and a memory reading operation while the third memory access operation belongs to the other memory access operation between the memory writing operation and the memory reading operation. The arbitrator is coupled to the first memory access request generating module, the second memory access request generating module, and the memory device; the arbitrator is implemented for arbitrating a plurality of memory access requests respectively outputted from the first memory access request generating module and the second memory access request generating module, thereby generating memory access grant signals corresponding to the memory access requests to the memory device sequentially.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "coupled" and "couples" are intended to mean either an indirect or a direct electrical connection. Thus, if a first device couples to a second device, that connection may be through a direct electrical connection, or through an indirect electrical connection via other devices and connections.

Figure 1:
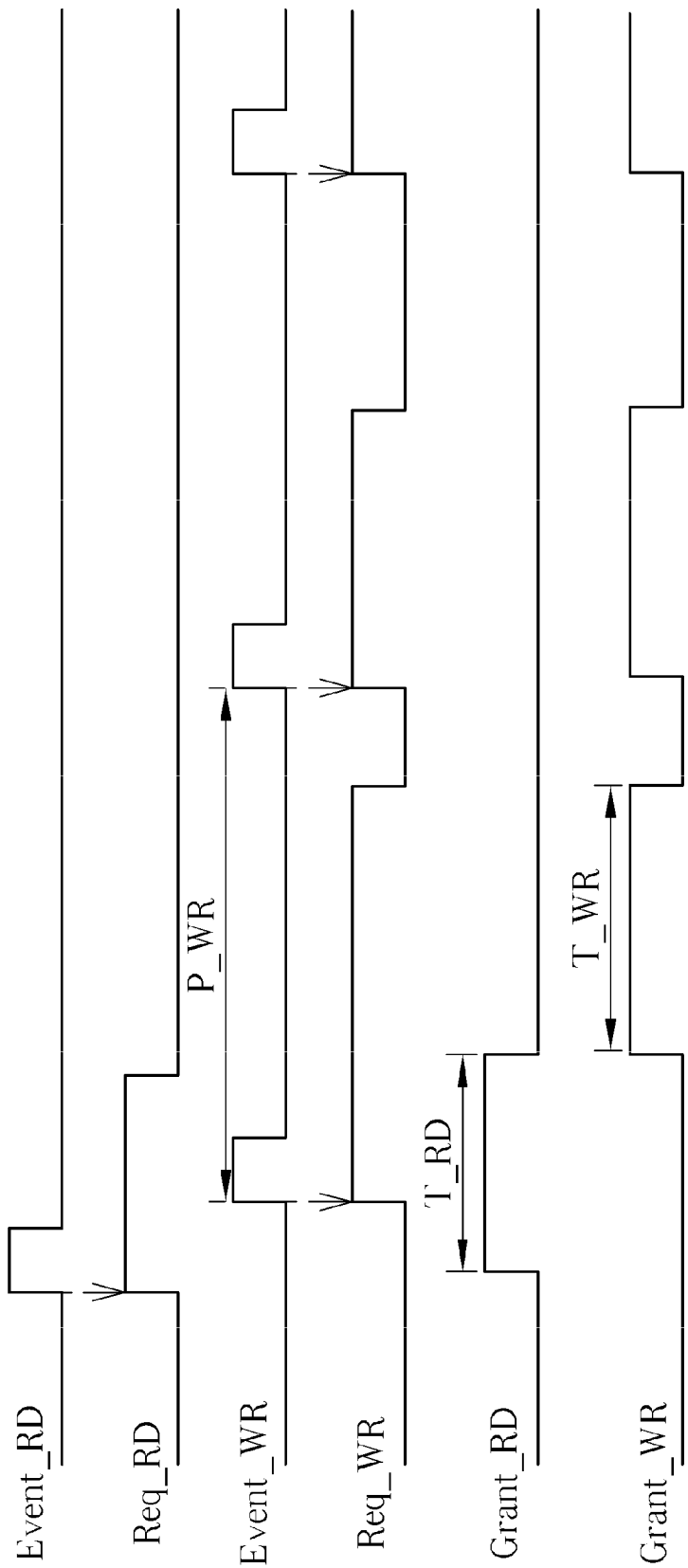
FIG. 1 is a diagram illustrating signals of a conventional memory access control device.
Figure 2:
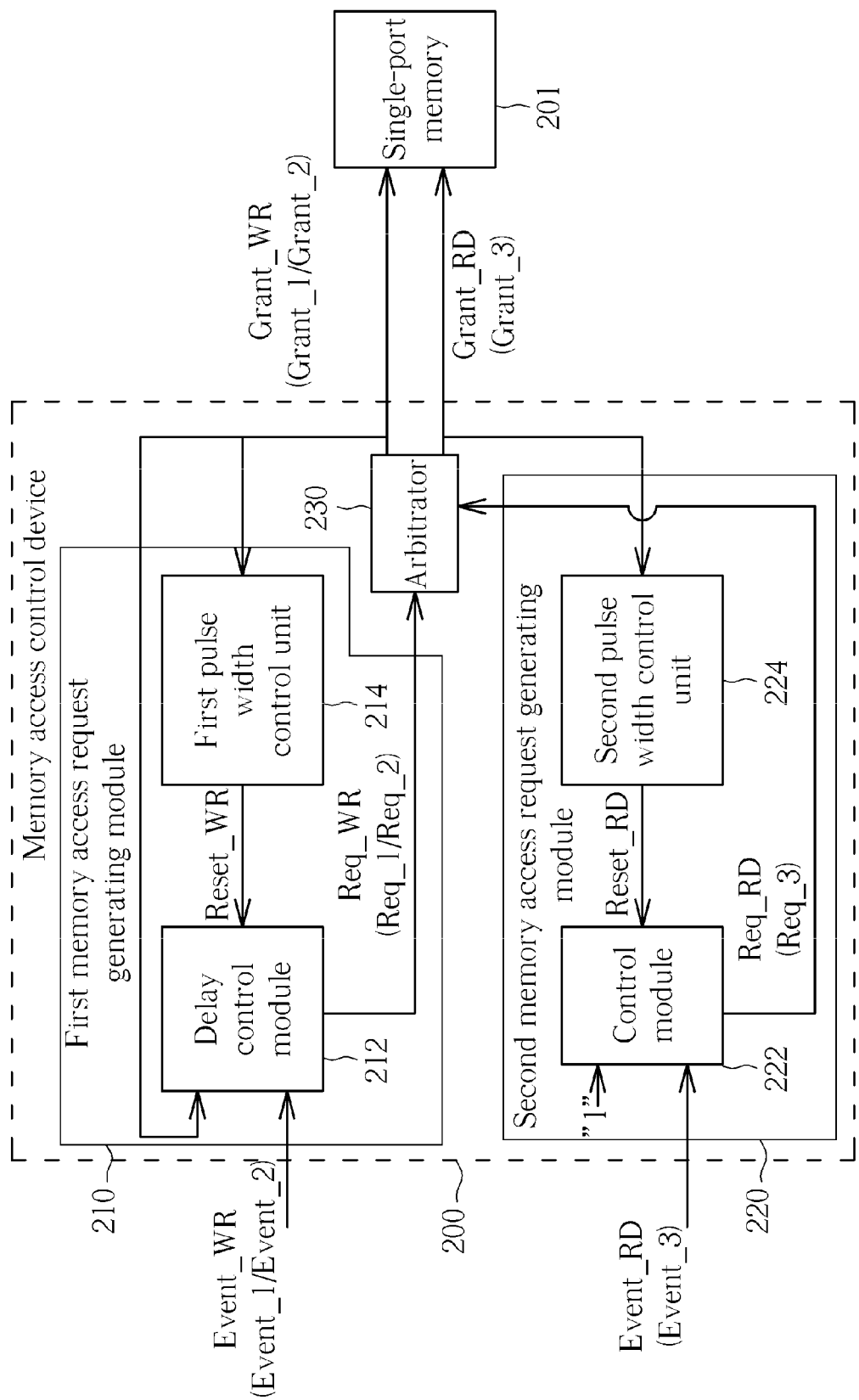
FIG. 2 is a diagram illustrating an exemplary embodiment of a memory access control device of the present invention.

FIG. 2 is a diagram illustrating an exemplary embodiment of a memory access control device 200 of the present invention. In this embodiment the memory access control device 200 is coupled to a single-port memory 201, wherein the single-port memory 201 can be a random access memory (RAM). The memory access control device 200 is utilized for receiving memory read events Event_RD and memory write events Event_WR and outputting memory read grant signals Grant_RD and memory write grant signals Grant_WR to the single-port memory 201 in accordance with the received memory access events (i.e., memory read events/memory write events).

As mentioned above, a critical characteristic of the present invention is that the memory access requests of a single-port memory device and the corresponding memory access events are no longer restricted to be synchronized, and the memory access control device outputs a memory access request corresponding to a following memory access event after a delay time when single-port memory receives the following memory access event (e.g., a memory write event) while the single-port memory 201 is performing a former memory access operation corresponding to a previous memory access event, thereby the unnecessary waiting time is decreased and the access efficiency of the single-port memory is highly promoted. The detailed descriptions of the memory access control device of the present invention are disclosed as follows.

Please refer to FIG. 2 again. The memory access control device 200 includes (but is not limited to) a first memory access request generating module 210, a second memory access request generating module 220 and an arbitrator 230, wherein the first memory access request generating module 210 and the second memory access request generating module 220 respectively correspond to different types of memory access operations (e.g., memory write operations or memory read operations).

For the sake of brevity, in the following description the first memory access request generating module 210 is a memory write request generating module while the second memory access request generating module 220 is a memory read request generating module. The first memory access request generating module 210 receives a memory write event Event_WR, and selectively delays a memory write request Req_WR corresponding to the memory write event Event_WR to the single-port memory 201, or directly outputs the memory write request Req_WR after receiving the memory write event Event_WR. Simultaneously, the second memory access request generating module 220 receives a memory read event Event_RD and outputs a memory read request Req_RD to the arbitrator 230.

In this exemplary embodiment, the first memory access request generating module 210 has a delay control module 212 and a first pulse width control unit 214; the second memory access request generating module 220 has a control module 222 and a second pulse width control unit 224. The delay control module 212 is coupled to the arbitrator 230 and the first pulse control unit 214, and the delay control module 212 dynamically outputs a memory write request (Req_1 or Req_2) according to the received memory write events Event_WR (e.g., Event_1 and Event_2), the memory write grant signals Grant_WR (Grant_1, and Grant_2), and memory write reset signals Reset_WR.

The first pulse width control unit 214 is coupled to the arbitrator 230 and outputs the memory write reset signal Reset_WR to the delay control module 212 according to the memory write grant signal (Grant_1 or Grant_2) received from the arbitrator 230.

In an exemplary embodiment, the control module 222 can be a register, such as a flip-flop. The control module 222 is coupled to the second pulse width control unit 224, and the control module 222 has a first input terminal for receiving a predetermined logic level "1" as an input signal, a clock terminal for receiving memory read events Event_RD, a negative triggering terminal for receiving the reset signal Reset_RD, and an output terminal.

The control module 222 outputs the memory read request Req_RD to the arbitrator 230 according to the received signals. The second pulse width control unit 224 is coupled to the control module 222 and the arbitrator 230; the second pulse width control unit 224 outputs the memory read reset signal Reset_RD to the control module 222 according to the memory read grant signals Grant_RD corresponding to the specification with which the single-port memory complies.

The arbitrator 230 sequentially outputs the memory grant signals (Grant_1, Grant_2, Grant_3) according to the memory write requests (Req_1, Req_2) from the first memory access request generating module 210 and the memory read request (Req_3), respectively, from the second memory access request generating module 220 to the single-port memory 201, and then performs related memory access operations according to the memory access grant signals.

Please note that using a RAM as the single-port memory 201 is for illustrative purposes only and is not meant to be a limitation of the present invention. In addition, the first memory access request generating module 210 corresponding to memory write operations and the second memory access request generating module 220 corresponding to memory read operations is for illustrative purposes only. With appropriate adjustments, the alternative first memory access request generating module 210 can be used to generate the memory read request Req_RD according to the memory read events Event_RD while the second memory access request generating module 220 at this time corresponds to the memory write operations. These alternative designs obey and fall within the scope of the present invention. Moreover, the individual blocks in FIG. 2 are for illustratively purposes only; other hardware configurations obeying the spirit of the above disclosure also fall within the scope of the present invention.

Figure 3:
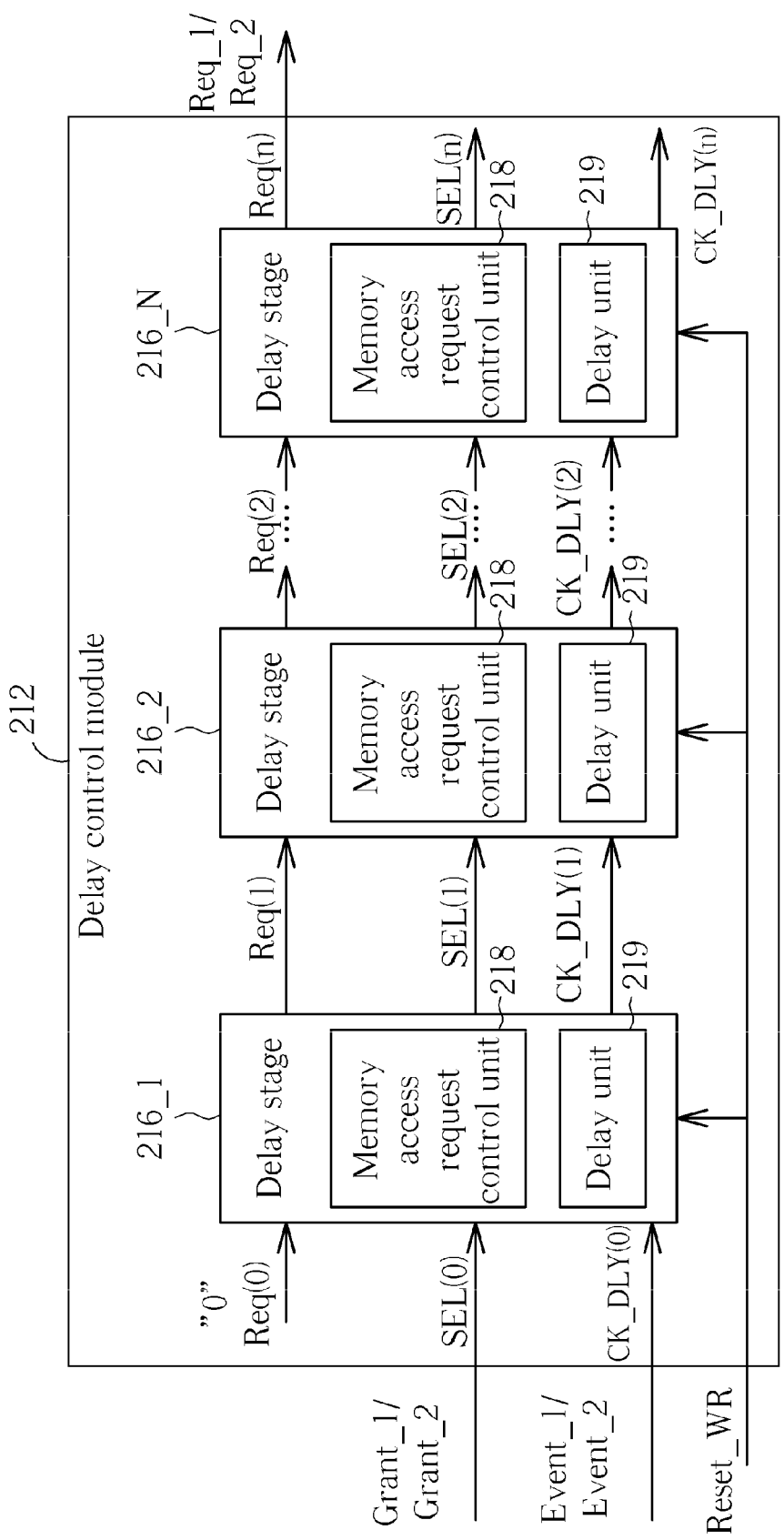
FIG. 3 is a block diagram illustrating the delay control module in FIG. 2.

Please refer to FIG. 3 in conjunction with FIG. 2. FIG. 3 is a block diagram illustrating the delay control module 212 in FIG. 2. In this embodiment, the delay control module 212 includes a plurality of delay stages 216_1~216_N connected in series. Inside each delay stage are a memory access request control unit 218 and a delay unit 219. Supposing that the first memory access request generating module 210 receives a second memory write event Event_2 while the single-port memory 201 is performing a first memory writing operation corresponding to a first memory write event Event_1 (i.e., the memory write grant signal corresponding to the first memory write event is at logic "1"), then the delay unit 218 will delay the received second memory write event Event_2 by a predetermined delay amount Td, then release the delayed second memory write event Event_2 to a next delay stage 218, wherein the magnitude of the specified delay amount Td varies according to different design requirements: for instance, a preferred magnitude of the time delay Td is around 1~2 ns. The detailed operations of the memory access request control unit 218 are disclosed as follows.

Figure 4:
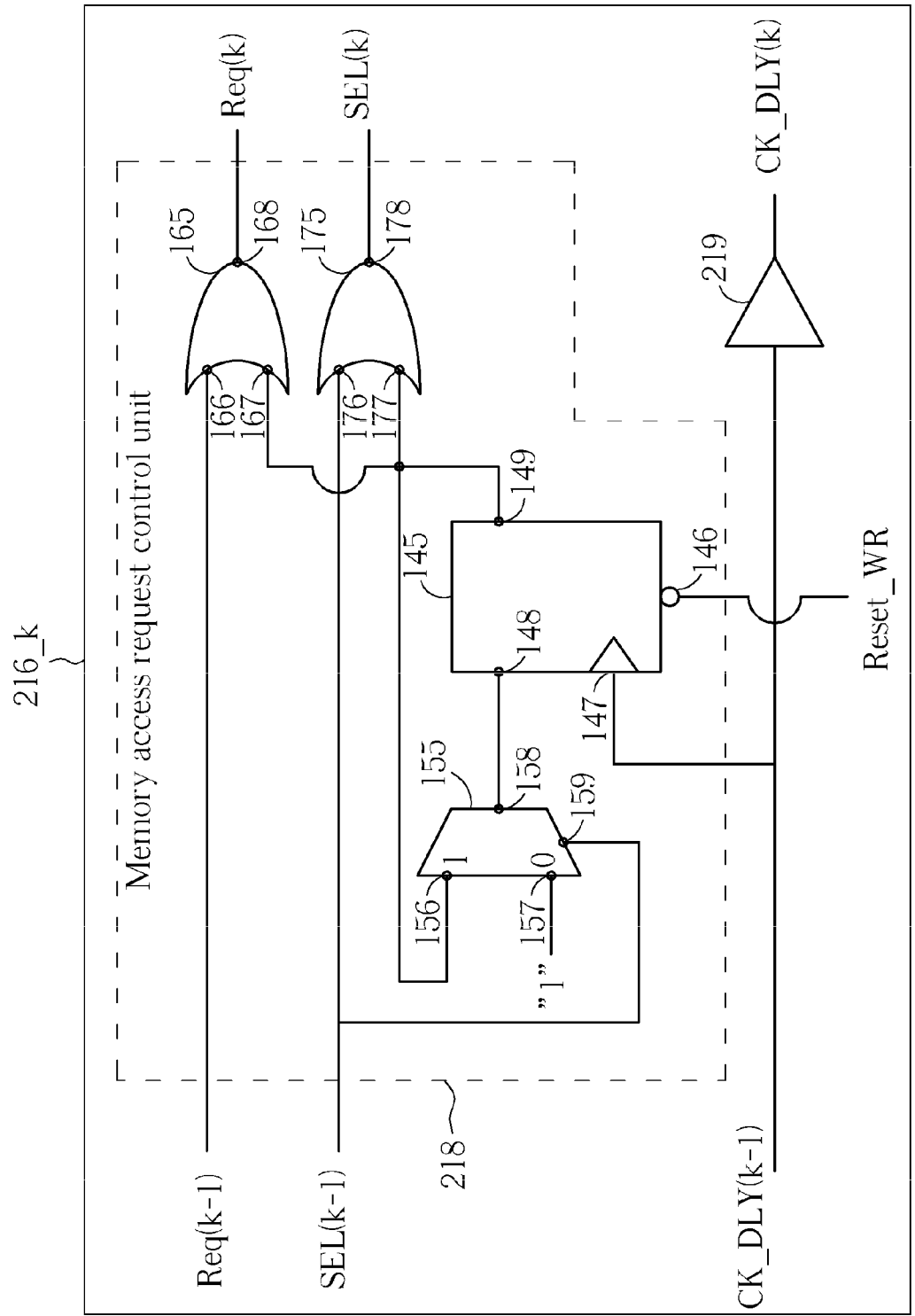
FIG. 4 is a diagram illustrating an exemplary embodiment of the memory access request control unit in FIG. 3.

Please refer to FIG. 4 in conjunction with FIG. 2 and FIG. 3. FIG. 4 is a diagram illustrating an exemplary embodiment of the memory access request control unit 216_K in FIG. 3. As shown in FIG. 4, a selecting signal SEL(k−1) corresponds to a memory write grant signal Grant_WR, and a clock signal CK_DLY(k−1) corresponds to a memory write event Event_WR. Here, the selecting signal SEL(k) outputted from the delay stage 216_k serves as a selecting signal of a next delay stage while the clock signal CK_DLY(k) serves as a clock signal of the next delay stage.

For the delay stage 216_k, the memory access request control unit 218 includes a flip-flop 145, a multiplexer 155, a first logic gate 165 and a second logic gate 175. The flip-flop 145 has a clock terminal 147 for receiving a memory write event Event_WR (CK_DLY (k−1)), a reset terminal 146 for receiving a memory write reset signal Reset_WR, an input terminal 148 and an output terminal 149, wherein the reset terminal 146 herein is a negative triggering terminal and the input terminal 148 of the flip-flop 145 is coupled to an output terminal 158 of the multiplexer 155.

The flip-flop 145 outputs a memory operating state signal via the output terminal 149 according to the memory write event Event_WR and a trigger of the memory write request reset signal Reset_WR. For example, the flip-flop 145 receives a logic level from the input terminal 148 and then outputs the received logic level after being triggered when the clock signal CK_DLY(k−1) converts from logic level "0" to logic level "1" since a memory write event Event_WR is received by the delay control module 212.

Moreover, the flip-flop 145 is reset as logic level "0" when the first pulse width control unit 214 generates a memory write reset signal Reset_WR. Please note, in this illustrative embodiment, the output terminal 149 of the flip-flop 145 is coupled to the input terminal 156 of the multiplexer 155, a second input terminal 167 of the first logic gate 165, and a second input terminal 177 of the second logic gate 175.

As shown in FIG. 4, a first input terminal 156 of the multiplexer 155 receives the memory operating signal from the output terminal 149 of the flip-flop 145, and a second input terminal 157 of the multiplexer 155 receives the logic level "1", wherein the memory write grant signal Grant_WR is used to set the selecting signal SEL(k−1) received via a control terminal 159 of the multiplexer 155. In other words, the logic level of the memory write grant signal Grant_WR received via the control terminal 159 of the multiplexer 155 determines the output value of the output terminal 158.

For example, the multiplexer 155 outputs the signal received from the first input terminal 156 when the memory write grant signal Grant_WR is logic "1", otherwise, the multiplexer 155 outputs the logic "1" received from the second input terminal 157. That is, the multiplexer 157 selectively outputs a signal from the first input terminal 156 or the second input terminal 157 as the memory operating state signal to the flip-flop 145 according to the memory write grant signal Grant_WR.

In this embodiment, the first logic gate 165 and the second logic gate 175 are both OR gates. A first input terminal 166 of the first logic gate 165 receives the memory write request signal Req(k−1), and a second input terminal 167 of the first logic gate 165 receives the memory operating state signal from the output terminal 149 of the flip-flop 145; the first logic gate 165 executes an "OR" operation according to the signal received from the first input terminal 166 and the second input terminal 167, and thereby outputs the operation result from the output terminal 168 to serve as a memory write request signal Req(k) of a next memory access control unit 218, so the next access request control unit 218 is in a logic stage connected to the delay stage as illustrated in FIG. 4.

That is, a signal outputted via the output terminal 168 of the first logic gate 165 in the delay stage 216_1 serves as the memory write request signal Req(1) of the delay stage 216_2. In addition, in this exemplary embodiment, the memory write request signal Req(0) of the first delay stage 216_1 has a predetermined logic level "0".

A first input terminal 176 of the second logic gate 175 receives the memory write grant signal Grant_WR from the former delay stage, wherein the memory write grant signal Grant_WR here is expressed as the memory operating stage signal SEL(k−1) of the output terminal 149 of the flip-flop 145 that is ahead of the current delay stage. The second input terminal 177 of the second logic gate 175 receives the memory operating state signal from the output terminal 149 of the flip-flop 145, thereby the second logic gate 175 executes an "OR" operation on the received signals from the first input terminal 176 and the second input terminal 177 to output the operating result from the output terminal 178. The output signal serves as the select signal SEL(1) of the following delay stage 216_2.

Please note that the delay amount Td of the delay unit 219 is used to determine a time interval of two flip-flops 145 of two adjacent delay stages: for instance, in this exemplary embodiment, the delay amount Td is around 1~2 ns, wherein the magnitude of the delay amount Td varies depends on different design requirements. However, it should be noted that when the delay amount Td is set too large, the time interval between a former memory write operation being finished and a memory write request of a following write operation not yet being triggered will increase correspondingly, hence downgrading the write efficiency of the memory device. In another aspect, the memory delay control module 212 needs more delay stages to fit the delay operation if the delay amount Td is set too small.

Figure 5:
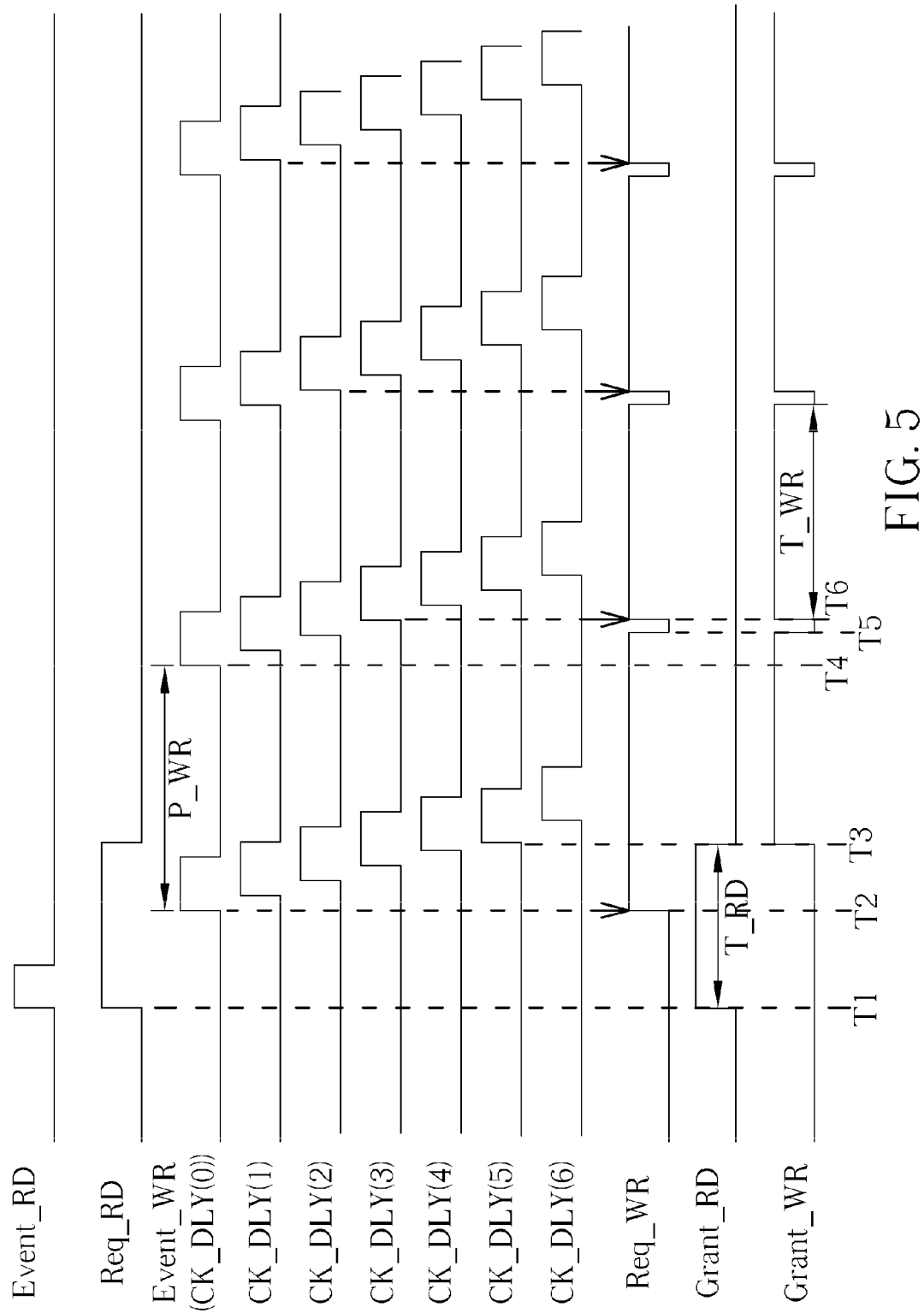
FIG. 5 is a timing diagram illustrating a memory access operation corresponding to an exemplary embodiment of the memory access control device in FIG. 2.

Please refer to FIG. 5 in conjunction with FIG. 2, FIG. 3, and FIG. 4. FIG. 5 is a timing diagram illustrating a memory access operation corresponding to an exemplary embodiment of the memory access control device 200 in FIG. 2. At T1, the memory access control device 200 receives a memory read event Event_RD, thereby the control module 222 controls the memory read request Req_RD to change from logic "0" to logic "1" and informs the arbitrator 230. Since the single-port memory 201 does not execute a memory access operation at T1, the arbitrator 230 arbitrates the read operation to pull up the memory read grant signal Grant_RD for converting the memory read grant signal Grant_RD from logic "0" to logic "1".

At T2, the memory access control device 200 receives a memory write event Event_WR. For the first delay stage 216_1 of the delay control module 212, the memory write request Req(0) is logic "0", the selecting signal SEL(0) is logic "0" and the clock signal CK_DLY(0) is logic "1"; the multiplexer 155 of the first delay stage 216_1 hence outputs logic "1" and the flip-flop 145 outputs logic "1" simultaneously due to the trigger of the clock signal CK_DLY(0). The write request signal Req(k+1) is set to be logic "1" after the OR operation, which leads to the last delay stage 216_N of the delay control module 212 outputting logic "1". In other words, the memory write request Req_WR is set to be logic "1" at T2 to inform the arbitrator 230. However, the arbitrator 230 holds the memory write operation since the single-port memory 201 is engaged by the memory read operation.

At T3, the arbitrator 230 resets the memory read grant GRANT_RD and pulls up the logic level of the memory write grant Grant_WR from logic "0" to logic "1" since the single-port memory 201 finishes the memory read operation according to the specification of the memory device 201.

At T4, another memory write event Event_WR occurs and thereby the logic level of the memory write event Event_WR is again pulled up as level "1" while the single-port memory 201 is performing the memory write operation corresponding to the former memory write event. The first delay stage 216_1 of the delay control module 212 at this time does not receive the memory write reset signal Reset_WR corresponding to the memory write grant Grant_WR since the memory write operation corresponding to the former memory write grant is still not finished. That is, for the first delay stage 216_1, the memory write request Req(0) is logic "0", the selecting signal SEL(0) is logic "1" and the clock signal CK_DLY(0) is logic "1". The multiplexer 155 of the first delay stage 216_1 outputs logic 1", and the flip-flop 145 outputs logic "1" corresponding to the trigger of the clock signal CK_DLY(0), thereby the memory write request Req(k+1) remains at logic "1" after the OR operation of the first logic gate and leads to the logic level output from the last delay stage 216_N being high (logic "1"). That is, the memory write request Req_WR at T4 remains at logic "1" corresponding to the memory write grant Grant_WR starting at T3 due to the operation of the delay control module 212. The memory write event Event_WR occurring at T4 is delayed by the delay stages of the delay control module 212, and the corresponding operation is illustrated by signals CK_DLY(1)~CK_DLY(6). The memory write request Req(0)~Req(k) of the delay stages remains at logic "1" after the OR operation of the second logic gate therein and keeps the logic level "1" being outputted from the last delay stage 216_N before T5.

At T5, the single-port memory 201 finishes the memory write operation corresponding to the former memory write event according to the specification to allow the arbitrator 230 to reset the memory write grant Grant_WR corresponding to the former memory write event. The first pulse width control unit 214 therefore outputs a memory write reset signal Reset_WR corresponding to the reset of the memory write grant Grant_WR. At this time, the outputted Req(n) and selecting signal SEL(n) from each delay stage 216_1~216_N are logic "0" due to the logic level of the inputted Req(n−1) and SEL(n−1) being at a low logic level.

At T6, the flip-flop 145 of the third delay stage is triggered via the clock signal CK_DLY(3), thereby pulling the memory write request Req_WR up to change from logic "0" to logic "1" corresponding to the later memory write event. Therefore, the memory write grant signal Grant_WR is again pulled up to logic "1" after the arbitrator 230 receives the memory write request Req_WR held by the memory access control device 200

To fit logic rules, there are some critical conditions of the memory access control device 200. The first critical condition is: an accumulated delay amount (N*Td) of all the delay stages of the delay control module 212 needs to be shorter than a required time (T_WR in FIG. 5) of the memory write operation since, in this exemplary embodiment, the delay amount of each delay stage is supposed to be Td for illustrative purposes. The first critical condition is expressed as equation (1).

$$N*Td \triangleleft T\_WR \quad (1)$$

The memory access operations are performed with errors once the equation is disobeyed. For instance, when the accumulated amount is larger than the required time T_WR of a memory write operation, the single-port memory 201 will erroneously receive two memory write requests Req_WR corresponding to a same memory write event Event_WR. That is, when the accumulated delay amount corresponding to the delay control module 212 is too large, the single-port memory 201 receives a wrong informing signal and thereby redundantly executes a same write operation.

In addition, the memory access control device 200 needs to fit another condition. That is, if a time interval of two memory write events is expressed as P_WR in FIG. 5, an accumulated delay amount of the delay control module 212 is expressed as N*Td, and a required time of each memory write operation corresponding to the single-port memory 201 is T_WR while a required time of each memory read operation corresponding to the single-port memory 201 is T_RD. The second critical condition of the memory access control device 200 is expressed as equation (2).

$$P\_WR+N*Td \triangleright T\_WR+T\_RD \qquad (2)$$

The second critical condition is to ensure to delay one of the memory operations when there is a collision corresponding to a memory write request Req_WR and a memory read request Req_RD since the memory device of the present invention is a single-port memory that is restricted to perform one memory access operation at a time, thereby leading to one of the memory access requests needing to be delayed.

Figure 6:
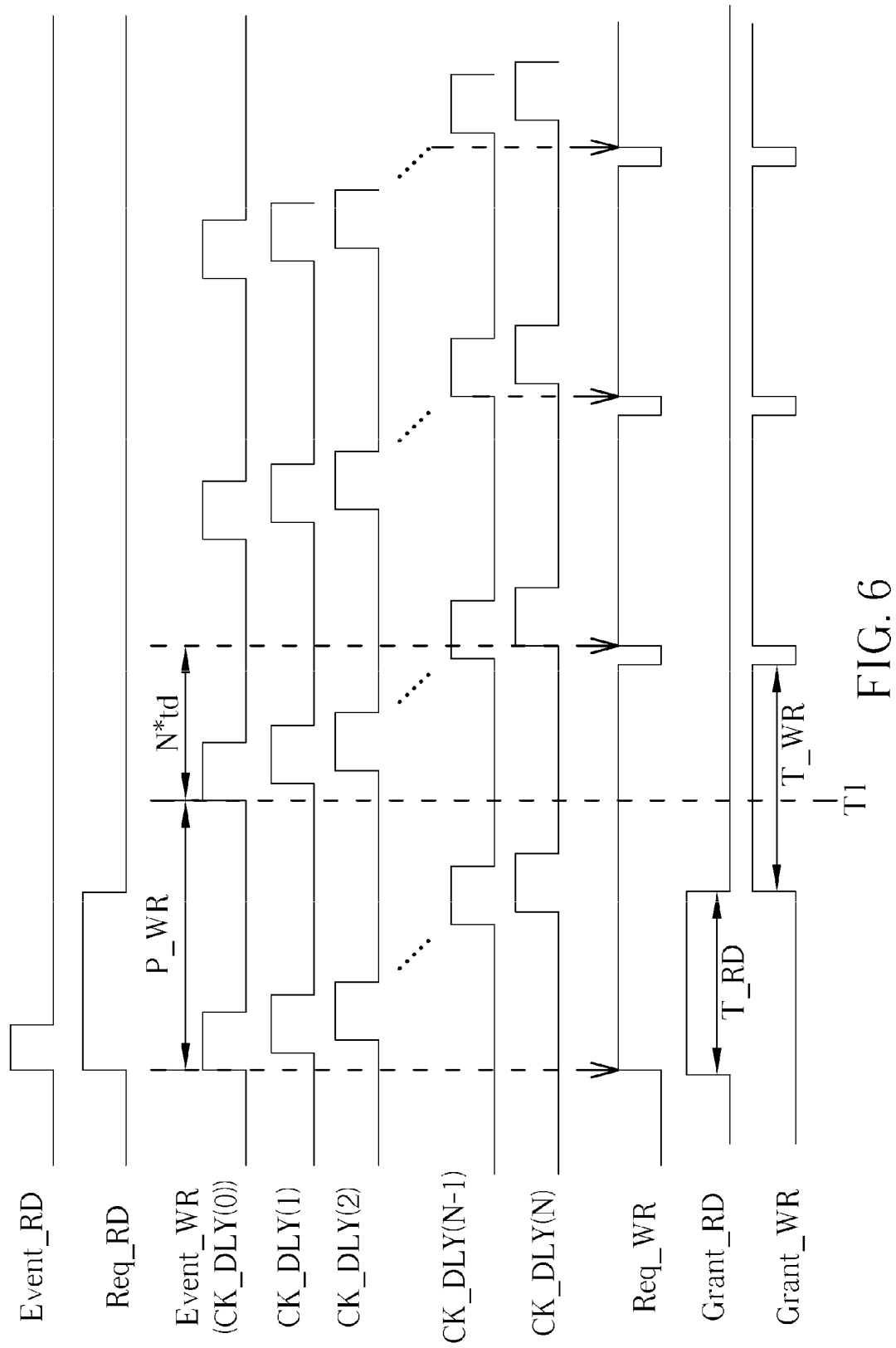
FIG. 6 is a timing diagram according to an exemplary embodiment of the memory access control device of the present invention.

Please refer to FIG. 6. FIG. 6 is a timing diagram according to an exemplary embodiment of the memory access control device of the present invention. As shown in FIG. 6, the memory access control device 200 receives a memory write event Event_WR when the memory read event is set to be logic "1", thereby a memory write request Req_WR corresponding to the memory write event Event_WR is held until the single-port device 201 finishes the memory read operation (the memory read grant Grant_RD is reset to be logic "0") in order to transmit the memory write request Req_WR to the arbitrator 230 after a delay time.

For instance, the memory access control device 200 receives a memory write event Event_WR at T1 while the single-port memory 201 is performing a memory write operation corresponding to a former memory write event. According to the above disclosure, the awaiting memory write event Event_WR is delayed by the plurality of delay stages 216_1~216_N of the delay control device 212 to generate corresponding clock signals CK_DLY(n) for triggering each of the delay stage 216_n, respectively. To maintain accuracy, a clock signal of the clock signals CK_DLY(n) triggers a flip-flop 145 after the current memory write operation is finished (i.e., the memory write grant Grant_WR is reset from logic "1" to be logic "0") for pulling up the logic level of the memory write request Req_WR that correctly corresponds to the awaiting memory write event. If this does not happen, the awaiting memory write event Event_WR is missed since there is no memory write request Req_WR corresponding to the awaiting memory write event.

For example, if a timing relation corresponding to the memory access control device 200 disobeys the second equation: P_WR+N*Td⊳T_WR+T_RD, when the computing system outputs a new memory write command while the single-port memory 201 is performing a former memory write operation, the new memory write command will never be performed, which will cause the system accuracy to break down.

Furthermore, there is still another critical condition for the memory access control device of the present invention. This critical condition is expressed as equation (3).

$$P\_WR \triangleright T\_WR+T\_margin \qquad (3)$$

In this equation, P_WR expresses a time interval between two memory write events required by the computing system, T_WR expresses a required time for a single-port memory to perform a memory write operation (i.e., the time magnitude that the memory write grant remains at a high logic level); and T_margin illustrates a predetermined margin time set according to design requirements for ensuring the accuracy of the single-port memory device.

The aforementioned disclosure describes the operations of the disclosed memory access control device 200 when the writing frequency of the whole system is higher than the reading frequency. The delay control module 212 is configured to process the memory write events Event_WR for selectively outputting the corresponding memory write request Req_WR. However, people of ordinary skill in this art can easily realize the alternative memory access control device when the reading frequency of the system is higher than the writing frequency of the system.

For instance, in other exemplary embodiments, the delay control module 212 can be utilized to process the memory read events Event_RD to generate the memory read request Req_RD accordingly, wherein, in these alternative designs, the control module 222 is implemented to process the memory write events Event_WR to thereby generate the corresponding memory write requests Req_WR. These alternative designs obey and fall within the scope of the present invention.

In conclusion, the memory access control device reduces the time interval of a single-port memory for two memory write commands, thereby promoting the efficiency of memory access operations, and promoting the performance of a system using a single-port memory. other control devices delays the trigger of the memory access request after receiving the corresponding memory access event to break the synchronous relation of the memory access event and memory access request fall within the scope of the present invention.

Those skilled in the art will readily observe that numerous modifications and alterations of the device and method may be made while retaining the teachings of the invention.

What is claimed is:

1. A memory access control device, comprising:
a first memory access request generating module, for outputting a second memory access request corresponding to a second memory access event to a memory device after a delay time for executing a second memory access operation accordingly when the first memory access request generating module receives the second memory access event while the memory device is performing a first memory access operation according to a first memory access request corresponding to a first memory access event;
a second memory access request generating module, for outputting a third memory access request according to a third memory access event to the memory device for performing a third memory access operation, wherein each of the first memory access operation and the second memory access operation belongs to a same operation being one of a memory writing operation and a memory reading operation, while the third memory access operation belongs to the other of the memory writing operation and the memory reading operation; and an arbitrator, coupled to the first memory access request generating module, the second memory access request generating module, and the memory device, for arbitrating a plurality of memory access requests outputted from the first memory access request generating module and the second memory access request generating module respectively, to sequentially generate memory access grant signals corresponding to the memory access requests to the memory device;

wherein the first memory access request generating module further comprises a delay control module having a plurality of delay stages connected in series, each of the delay stages comprises:

a delay unit, for delivering the second memory access request to a next delay stage after delaying the second memory access event by a predetermined delay amount;

a memory access request control unit, for selectively clearing the first memory access request according to a reset signal, and for selectively controlling the delay control module to maintain the first memory access request or to output the second memory access request when triggered by the second memory access event received by the delay unit, wherein the memory access request control unit controls the delay control module to output the second memory access request when a first memory access grant corresponding to the first memory access request is cleared while the memory access request control unit is triggered by the second memory access event, and the memory access request control unit controls the delay control module to maintain outputting the first memory access request when the first memory access grant corresponding to the first memory access request is not yet cleared while the memory access control unit is triggered by the second memory access event; and a pulse width control unit, coupled to the delay units of the delay control module and the arbitrator, for outputting the reset signal after a first access time granted by the arbitrator for allowing the first memory access request to access the memory device.

2. The memory access control device of claim 1, wherein each memory access request control unit of the memory access request control units comprises:

a flip-flop, comprising:
    a reset terminal, for receiving the reset signal;
    a clock terminal, for receiving the second memory access event;
    an input terminal, for receiving a memory operating state signal; and
    an output terminal, for outputting the memory operating state signal according to a trigger at the clock terminal;

a multiplexer, comprising a first input terminal, a second input terminal, an output terminal, and a control terminal, wherein the first input terminal of the multiplexer is coupled to the output terminal of the flip-flop, the multiplexer selectively outputs a first input signal received via the first input terminal or a second input signal received via the second input terminal to the output terminal of the multiplexer as the memory operating state signal according to a memory access grant signal received via the control terminal of the multiplexer, and the output terminal of the multiplexer is coupled to the input terminal of the flip-flop;

a first logic gate, comprising a first input terminal, a second input terminal, and an output terminal, wherein the first input terminal of the first logic gate is configured for receiving a memory access request signal, the second input terminal of the first logic gate is coupled to the output terminal of the flip-flop, and the first logic gate outputs a memory access request signal corresponding to a memory access request control unit of a next delay unit via executing a first logic operation according to the memory access request signal and the memory operating state signal outputted from the flip-flop; and a second logic gate, comprising a first input terminal, a second input terminal, and an output terminal, wherein the first input terminal of the second logic gate is coupled to the control terminal of the multiplexer for receiving the memory access grant signal, the second input terminal of the second logic gate is coupled to the output terminal of the flip-flop, and the second logic gate outputs a memory access grant signal corresponding to the memory access request control unit of the next delay stage via executing a second logic operation according to the memory access grant signal and the memory operating state signal outputted from the flip-flop.

3. The memory access control device of claim 2, wherein the second input signal is a predetermined logic level.

4. The memory access control device of claim 2, wherein both the first logic gate and the second logic gate are OR gates.

5. The memory access control device of claim 1, wherein an accumulated delay of the delay stages is smaller than the first access time.

6. The memory access control device of claim 1, wherein the second memory access control request generating module comprises:

a control module, for outputting the third memory access request when receiving the third memory access event; and a second pulse width control unit, coupled to the control module and the arbitrator, for outputting another reset signal to the control module for clearing the third memory access request according to a third memory access grant signal that is outputted from the arbitrator and corresponds to the third memory access request, wherein a summation value of a time interval between the first and second memory access events and an accumulated delay amount of the delay units is larger than a summation value of the first access time and a second access time which is granted by the arbitrator for allowing the second memory access request to access the memory device.

7. The memory access control device of claim 1, wherein a time interval between the first memory access event and the second memory access event is larger than a summation value of the first access time and a predetermined preserving time.

8. The memory access control device of claim 1, wherein the memory device is a single-port memory.

9. A memory access control method comprising:

utilizing a first memory access request generating module for outputting a second memory access request corresponding to a second memory access event to a memory device after a delay time for executing a second memory access operation when the memory device receives the second memory access event while the memory device is performing a first memory access operation in response to a first memory access request corresponding to a first memory access event;

utilizing a second memory access request generating module for outputting a third memory access request to the memory device according to a third memory access event for executing a third memory access operation, wherein each of the first memory access operation and the second memory access operation belongs to a same operation being one of a memory reading operation and a memory writing operation, while the third memory access operation belongs to the other of the memory reading operation and the memory writing operation; and utilizing an arbitrator for arbitrating a memory access request corresponding to the memory reading operation and a memory access request corresponding to the memory writing operation, thereby sequentially generating memory access grant signals to the memory device corresponding to the memory access requests, wherein the arbitrator is coupled to the first memory access request generating module, the second memory access request generating module, and the memory device;

wherein the first memory access request generating module further comprises a delay control module having a plurality of delay stages connected in series, each of the delay stages comprises:

a delay unit, for delivering the second memory access request to a next delay stage after delaying the second memory access event by a predetermined delay amount;

a memory access request control unit, for selectively clearing the first memory access request according to a reset signal, and for selectively controlling the delay control module to maintain the first memory access request or to output the second memory access request when triggered by the second memory access event received by the delay unit, wherein the memory access request control unit controls the delay control module to output the second memory access request when a first memory access grant corresponding to the first memory access request is cleared while the memory access request control unit is triggered by the second memory access event, and the memory access request control unit controls the delay control module to maintain outputting the first memory access request when the first memory access grant corresponding to the first memory access request is not yet cleared while the memory access control unit is triggered by the second memory access event; and a pulse width control unit, coupled to the delay units of the delay control module and the arbitrator, for outputting the reset signal after a first access time granted by the arbitrator for allowing the first memory access request to access the memory device.

\* \* \* \* \*